United States Patent [19]
Khinkis et al.

[11] Patent Number: 5,725,366
[45] Date of Patent: Mar. 10, 1998

[54] HIGH-HEAT TRANSFER, LOW-NOX OXYGEN-FUEL COMBUSTION SYSTEM

[75] Inventors: Mark J. Khinkis, Morton Grove; Hamid A. Abbasi, Darien; Roman E. Grosman, Lombard, all of Ill.

[73] Assignee: Institute of Gas Technology, Des Plaines, Ill.

[21] Appl. No.: 609,065

[22] Filed: Feb. 29, 1996

Related U.S. Application Data

[63] Continuation-in-part of Ser. No. 219,496, Mar. 28, 1994, abandoned.

[51] Int. Cl.$^6$ .............................. F23M 3/04; F23D 11/44
[52] U.S. Cl. .................. 431/10; 431/353; 431/11; 431/215
[58] Field of Search .................. 431/215, 11, 242, 431/243, 8, 9, 10, 181, 187, 159

[56] References Cited

U.S. PATENT DOCUMENTS

| | | |
|---|---|---|
| 3,656,878 | 4/1972 | Wright . |
| 3,975,138 | 8/1976 | Kinney et al. . |
| 4,358,268 | 11/1982 | Neville . |
| 4,488,866 | 12/1984 | Schirmer et al. . |
| 4,761,132 | 8/1988 | Khinkis . |
| 4,909,727 | 3/1990 | Khinkis . |
| 5,043,232 | 8/1991 | Landau et al. . |
| 5,057,133 | 10/1991 | Chen et al. . |
| 5,139,755 | 8/1992 | Seeker et al. . |
| 5,158,445 | 10/1992 | Khinkis . |
| 5,161,366 | 11/1992 | Beebe . |
| 5,180,300 | 1/1993 | Hovis et al. . |
| 5,216,968 | 6/1993 | Capek et al. . |
| 5,248,252 | 9/1993 | Delichatsios et al. . |
| 5,346,390 | 9/1994 | Slavejkov et al. ............... 431/8 |
| 5,490,775 | 2/1996 | Joshi et al. ............... 431/187 |

FOREIGN PATENT DOCUMENTS

| | | |
|---|---|---|
| 0293168 | 11/1988 | European Pat. Off. . |
| 0463277 | 1/1992 | European Pat. Off. . |
| 0644374 | 3/1995 | European Pat. Off. . |
| 9000960 | 9/1993 | Germany . |
| 63-315814 | 12/1988 | Japan . |
| 9002907 | 3/1990 | WIPO . |
| 9516880 | 6/1995 | WIPO . |

*Primary Examiner*—Carl D. Price
*Attorney, Agent, or Firm*—Speckman, Pauley & Fejer

[57] ABSTRACT

A process and apparatus for combustion of a fuel/oxidant mixture in which at least a portion of the fuel is preheated and, thereafter, burned with any remaining portion of fuel in a flame having fuel-rich zones, thereby forming soot within the resulting flame to produce a luminous, high heat transfer, low $NO_x$ flame.

12 Claims, 3 Drawing Sheets

HIGH-HEAT TRANSFER, LOW-NOX OXYGEN-FUEL COMBUSTION SYSTEM

CROSS REFERENCE TO RELATED APPLICATION

This application is a continuation-in-part application of a U.S. patent application, Ser. No. 08/219,496, having a filing date of 28 Mar. 1994, now abandoned.

BACKGROUND OF THE INVENTION

1. Field of the Invention

This invention relates to a process and apparatus for oxygen-enriched combustion of fuel, preferably natural gas, in which the fuel is preheated and burned in a manner which enhances in-flame soot formation and flame luminosity.

2. Description of Prior Art

New environmental requirements are a major driving force today for the development of new combustion methods and apparatuses. Manufacturers are being forced to reduce emissions, all the while striving to control costs and maintain product quality. For example, the glass industry is faced with the need to reduce $NO_x$ emissions significantly. In response thereto, advanced combustion systems, oxygen-enrichment, and oxygen-fuel combustion are being developed. In those instances where fuel and oxygen are essentially free of nitrogen, $NO_x$ emissions can be significantly reduced. However, nitrogen is often found in fuel as well as in oxygen produced by more cost efficient processes. Raw material feed stocks, such as glass mixing feed stocks, and air infiltration into an industrial furnace can also introduce nitrogen into the flame. As a result, all of these sources of nitrogen can result in increased $NO_x$ emissions, thereby negating part of the $NO_x$ reduction benefit derived from using oxygen in the combustion process. In addition, because of the high cost of oxygen and the absence of highly effective heat-recovery from the flue gases, operating costs can also increase. Accordingly, in applications using oxygen-enriched fuel combustion, there is a clear need for reducing $NO_x$ emissions by improving heat transfer from the flame to the load being heated, and recovering heat from the flue gases exhausted by the combustion process.

U.S. Pat. No. 5,057,133 and U.S. Pat. No. 4,909,727 both teach modification of a fuel by preheating to produce a reformed and/or cracked fuel which is subsequently introduced into a combustion chamber for burning. The '133 patent teaches the use of furnace waste heat from an oxygen-enriched glass melting furnace to heat a reformer for partially reforming a fuel to produce a synthesis gas which is subsequently burned in the glass melting furnace. The '727 patent teaches a combustion process in which a portion of the fuel to be burned is cracked using oxygen-enriched air producing a cracked fuel, including soot, which is subsequently introduced into a combustion chamber with a second portion of fuel, producing a highly luminous flame. U.S. Pat. No. 5,216,968 teaches reduction of $NO_x$ emissions in a combustion process by preheating a fuel gas in a chamber separate and apart from a main combustion chamber to a temperature above the ignition temperature of the fuel gas and introducing the preheated fuel gas into the main combustion chamber where it mixes with an oxygen-containing gas and is burned.

Other methods of reducing $NO_x$ emissions from combustion processes are taught by U.S. Pat. No. 5,139,755 which teaches a reburning process for reducing $NO_x$ emissions in which reducing agents are introduced into a reburn zone of a combustion process, said reducing agents including fuel, to produce an oxygen deficient reburn zone and U.S. Pat. No. 5,180,300 which teaches a low $NO_x$ regenerative burner having a regenerative bed for preheating combustion air in which fuel is burned in stages and flue gases generated by the combustion process are recirculated into the combustion zones.

U.S. Pat. No. 4,488,866 teaches a process and apparatus for burning high-nitrogen, high-sulfur fuels in which the fuel is first treated to remove $SO_x$ precursors and the resulting fuel is then burned in a two-step process, a first fuel-rich stage followed by a second fuel-lean stage. U.S. Pat. No. 5,043,232 teaches a fuel processing system suitable for gas and liquid fuels for use in connection with fuel cell power generation systems in which the fuel is preheated in a heat exchanger for use in the fuel cell power generation system.

U.S. Pat. No. 5,161,366 teaches a gas turbine catalytic combustor having a preburner in which combustion products from the preburner are mixed with a hydrocarbon fuel in the presence of a combustion catalyst to ignite and initiate a catalytic combustion reaction after which the preburner is then shut down. Finally, U.S. Pat. No. 3,975,138 teaches an oil burner in which the liquid fuel is thermally cracked to produce gaseous hydrocarbons which are subsequently burned.

None of the prior art references cited hereinabove simultaneously address the combination of reduced $NO_x$ emissions and improved heat transfer from a flame using industrial oxygen for fuel preheat.

SUMMARY OF THE INVENTION

Accordingly, it is an object of this invention to provide a process and apparatus for combustion producing enhanced flame luminosity.

It is another object of this invention to provide a process and apparatus for combustion of a fuel which produces low $NO_x$ emissions.

These and other objects of this invention are achieved by a process for combustion of a fuel/oxidant mixture comprising preheating at least a portion of the fuel, mixing the preheated fuel with any remaining portion of the fuel and at least a portion of an oxidant required for complete combustion of said fuel, and burning the resulting mixture in a manner whereby fuel-rich zones, in which at least a portion of the fuel is further heated to above about 2000° F. in the absence of sufficient oxygen for complete combustion, thereby cracking a portion of the fuel to form soot, are formed within the flame. These zones are created through controlled mixing of the primary oxidant and the fuel within the flame which forms soot within the resulting flame. The formation of soot within the flame results in a flame having enhanced flame luminosity, thereby increasing the heat transfer from the flame to the load being treated and reducing $NO_x$ formation. In accordance with a preferred embodiment of this invention, the fuel is natural gas and the oxidant is oxygen or oxygen-enriched air.

Preheating of the fuel is accomplished in accordance with this process in a furnace heat recovery system, that is, by exchanging heat with flue products exhausted from the combustion process and/or by preburning a portion of the fuel with an oxidant and transferring at least a portion of the heat in the resulting precombustion products to the remaining portion of the fuel indirectly through a heat exchanger and/or directly by mixing and mixing the resulting precombustion products with the remaining portion of fuel.

An apparatus for combustion of a mixture of fuel and oxidant in accordance with this invention comprises preheat means for preheating at least a portion of said fuel, mixing means for mixing preheated fuel with at least a portion of an oxidant required for complete combustion of said fuel, and combustion means for combustion of said preheated fuel and said oxidant and any remaining portion of said fuel, whereby soot is formed within a flame, enhancing flame luminosity, thereby increasing heat transfer from the flame to the load being treated, and reducing $NO_x$ formation.

BRIEF DESCRIPTION OF THE DRAWINGS

These and other features and objects of this invention will be better understood from the following detailed description taken in conjunction with the drawings wherein.

DESCRIPTION OF PREFERRED EMBODIMENTS

The use of preheated fuel in accordance with the process of this invention produces reduced $NO_x$ emissions in the presence of nitrogen, improves the rate of heat transfer from the resulting flame to a load being processed, and reduces heat losses resulting from the ejection of high temperature flue gases from the combustion process. Preheated fuel, in particular natural gas, produces a more luminous flame, thus improving heat transfer and reducing flame temperature which, in turn, results in $NO_x$ formation reduction. Improved heat transfer provides benefits such as increased productivity and, eventually, smaller, more cost effective furnaces. These benefits increase even more where heat recovery from the flue gas is used for preheating fuel alone or in combination with a recuperator to produce hot partially reformed fuel.

Figure 1:
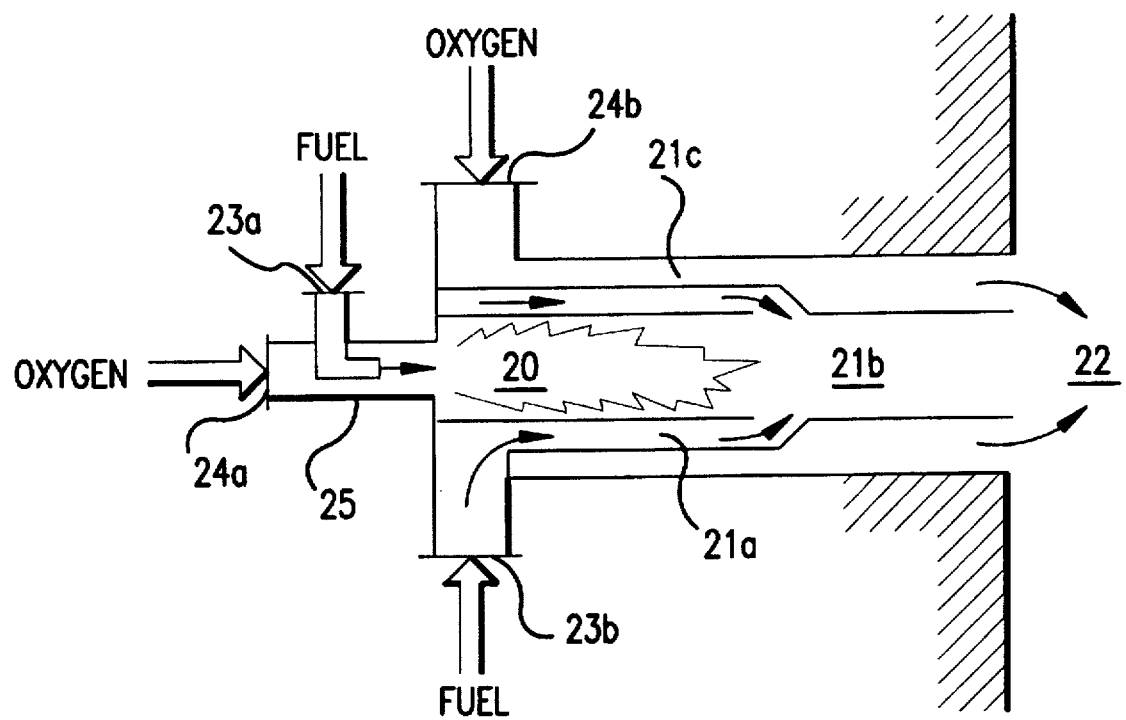
FIG. 1 is a schematic side view of a high-heat transfer, low-$NO_x$, oxygen-fuel combustion system in accordance with one embodiment of this invention where preheating of the fuel is accomplished by a precombustor.

FIG. 1 shows a schematic diagram of an oxygen-fuel burner design utilizing the process of this invention in which a portion of the fuel to be burned is burned separately within a burner space using oxygen in a precombustion zone. Hot gases so produced are used for preheating the remaining portion of the fuel stream in a preheating zone. The preheated fuel is then supplied to a furnace for combustion. This type of fuel is capable of producing soot when firing with an appropriate amount of industrial oxygen resulting in a significant increase in flame luminosity, improved heat transfer and reduced $NO_x$ emissions.

In particular, in accordance with one embodiment of this invention, a first portion of the fuel to be burned in the combustion process is introduced through precombustor fuel inlet 23a into precombustor 25 and precombustion oxidant, preferably oxygen or oxygen-enriched air, is introduced through precombustor oxidant inlet 24a into precombustor 25 in which the resulting oxidant-fuel mixture is burned, forming fuel precombustion zone 20. The remaining portion of fuel to be burned in the combustion process is introduced through primary combustion fuel inlet 23b into a first fuel preheat zone 21a and then into a second fuel preheat zone 21b where it mixes with precombustion products from fuel precombustion zone 20, resulting in preheating of the remaining portion of fuel. The preheating of fuel in first fuel preheat zone 21a and second fuel preheat zone 21b may be enhanced by utilizing a combustor in which said zones are formed by metallic walls which are protected from overheating by the flowing fuel and oxidant. The resulting preheated fuel is subsequently mixed in main combustion zone 22 with primary combustion oxidant introduced into main combustion zone 22 through primary combustion oxidant inlet 24b. To further enhance combustion efficiency, the primary combustion oxidant introduced through primary combustion oxidant inlet 24b may be preheated by indirect means in oxidant preheating zone 21c. By controlling the mixing of the primary combustion oxidant and the preheated fuel, soot is formed within the flame in main combustion zone 22 to produce a highly luminous flame having enhanced heat transfer characteristics. Also, due to the formation of soot within the flame, as well as the enhanced heat transfer from the flame to the load being processed, flame temperature is maintained generally below the level required for significant formation of $NO_x$ emissions. By controlled mixing, we mean a slow, generally non-turbulent mixing as opposed to a rapid, highly turbulent mixing whereby fuel-rich zones are created within the flame in which at least a portion of the fuel is further heated to above about 2000° F. in the absence of sufficient oxygen for complete combustion, thereby cracking a portion of the fuel to form soot.

Figure 2:
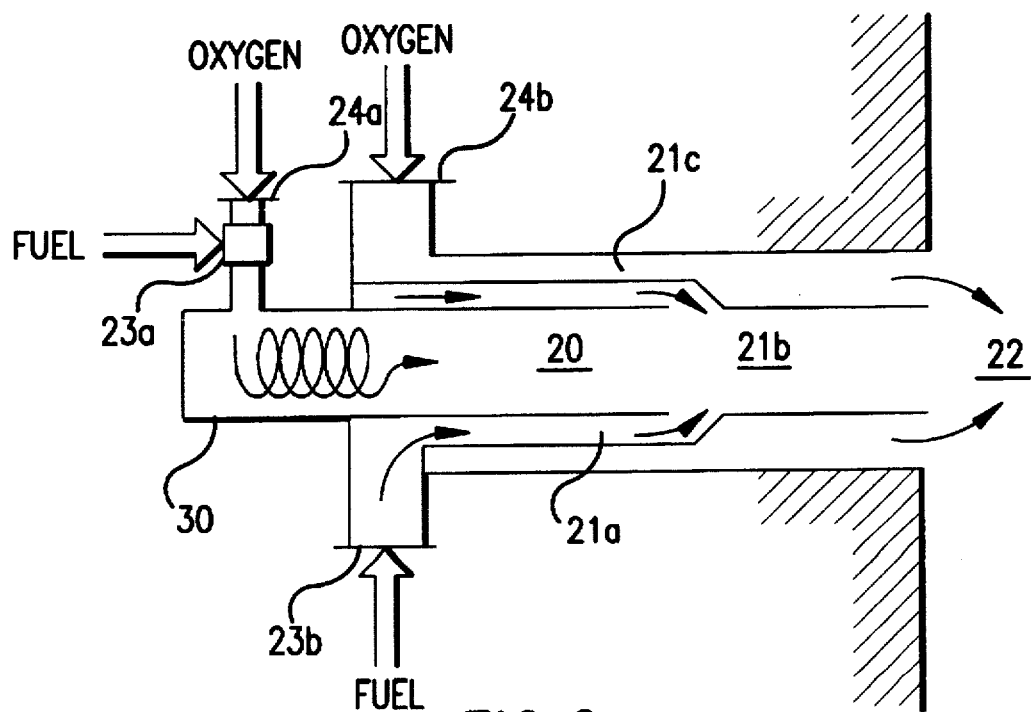
FIG. 2 is a schematic side view of a high-heat transfer, low-$NO_x$, oxygen-fuel combustion system in accordance with another embodiment of this invention where the fuel is preheated by a precombustor in the form of a colonic chamber.

In an alternative embodiment of this invention, colonic chamber 30 as shown in FIG. 2, is employed as a precombustor, fuel and oxidant being premixed and/or directly introduced into colonic chamber 30 in a manner which imparts a swirl to the combustion products. Using cyclonic chamber 30 as a precombustor in accordance with one embodiment of this invention produces high intensity, efficient combustion, low levels of $NO_x$ emissions within cyclonic chamber 30, and high heat transfer to the combustor walls and in the fuel preheating zone due to the swirling patterns within cyclonic chamber 30.

Figure 3:
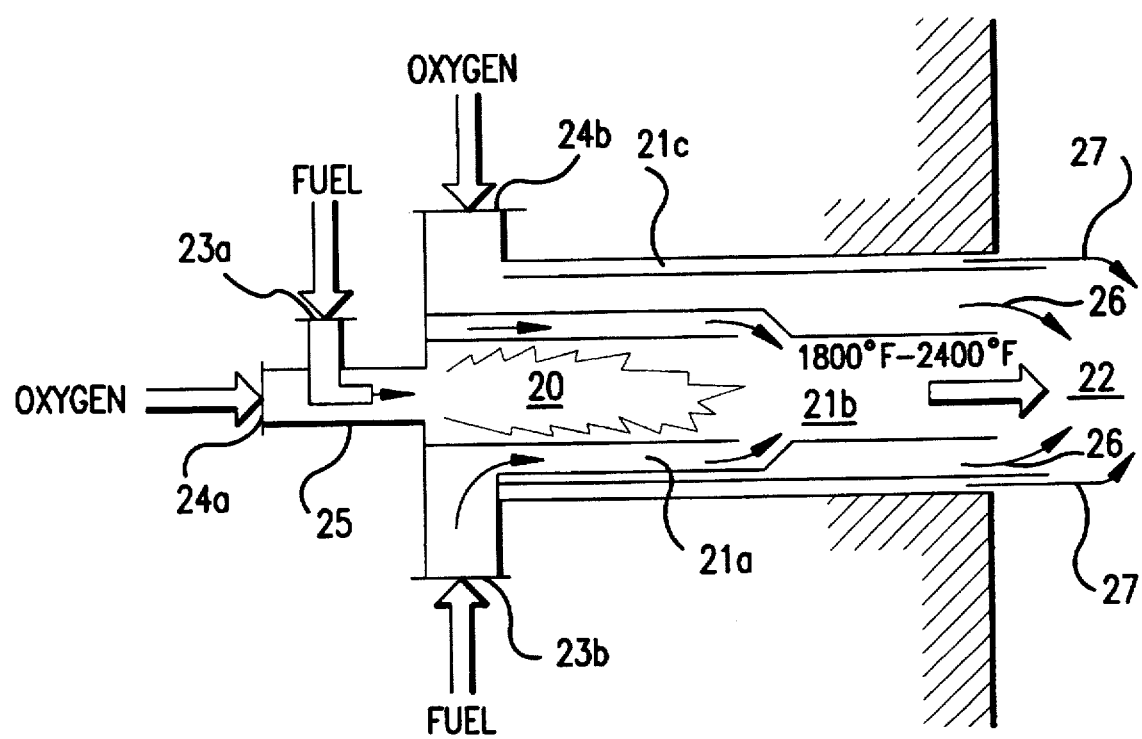
FIG. 3 is a schematic side view of a high-heat transfer, low-$NO_x$, oxygen-fuel combustion system in accordance with another embodiment of this invention where secondary oxidant is supplied in stages to promote formation of soot within the flame.

FIG. 3 shows a schematic diagram of an oxygen-fuel burner design utilizing the process of this invention in accordance with yet another embodiment of the burner of this invention. In accordance with the embodiment shown in FIG. 3, the secondary oxidant introduced through oxidant inlet 24b is provided to main combustion zone 22 in stages, a first portion of said oxidant mixing at an upstream end of main combustion zone 22 proximate the exit of the combustor and a second portion of said oxidant mixing downstream thereof as shown by arrows 26 and 27, respectively. The temperature of the preheated fuel/oxidant mixture at the exit of the combustor is preferably in the range of about 1800° F. to 2400° F. Operation within this temperature range is important for minimizing the formation of $NO_x$ within the flame. In addition, introducing the secondary oxidant into main combustion zone 22 in stages produces a fuel-rich zone within the center portion (core) of the flame, thereby promoting the formation of soot within the flame, and an oxidant-rich zone surrounding the flame core, thus ensuring complete combustion of the fuel. This represents one example of controlled mixing of fuel and oxidant in order to enhance soot formation within the flame and produce a luminous flame.

Figure 4:
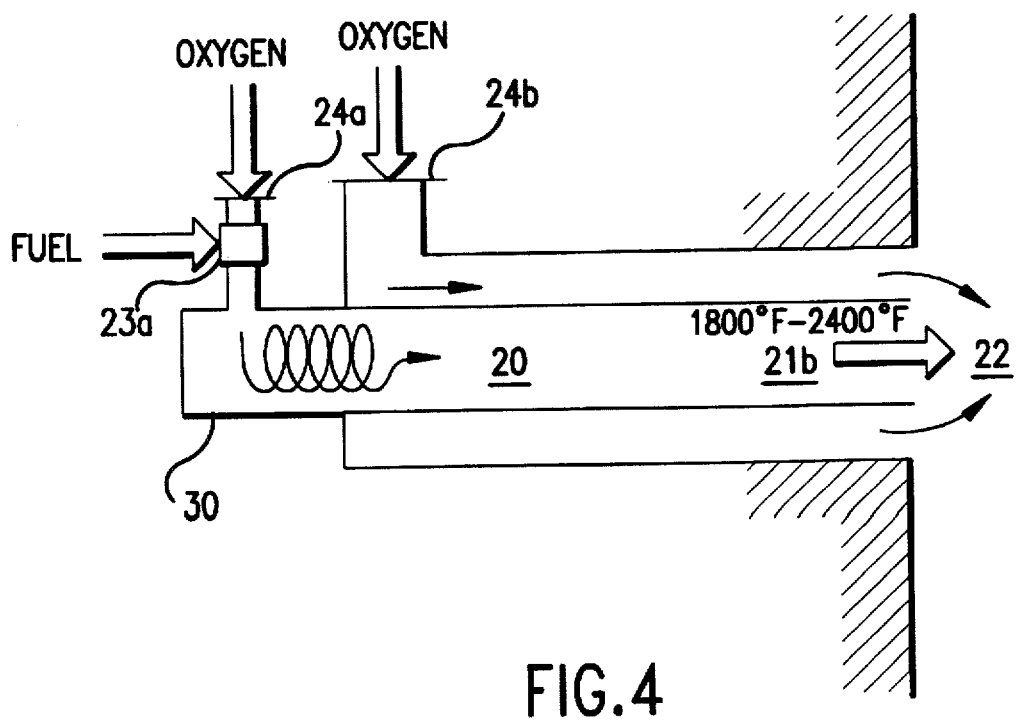
FIG. 4 is a schematic side view of a high-heat transfer, low-$NO_x$, oxygen-fuel combustion system in accordance with another embodiment of this invention where all of the fuel is preheated.

FIG. 4 shows a schematic diagram of an oxygen-fuel burner design utilizing the process of this invention in accordance with yet another embodiment of the burner of this invention. In accordance with this embodiment, in contrast to other embodiments, all of the fuel is introduced into the combustor in a single stage and mixed with a portion of the oxidant required for complete combustion of the fuel, resulting in partial combustion of a portion of the fuel and preheating of the remaining portion of the fuel. The temperature of the resulting mixture of products of partial combustion and preheated fuel proximate the exit end of the combustor is preferably in the range of about 1800° F. to 2400° F. Secondary oxidant is then introduced into the combustor through oxidant inlet 24b and passes in an annular region surrounding cyclonic combustion chamber 30 to the exit end of the combustor, enveloping the mixture of products of partial combustion and preheated fuel so as to form soot in main combustion zone 22 and enhance luminosity of the resulting flame.

Figure 5A:
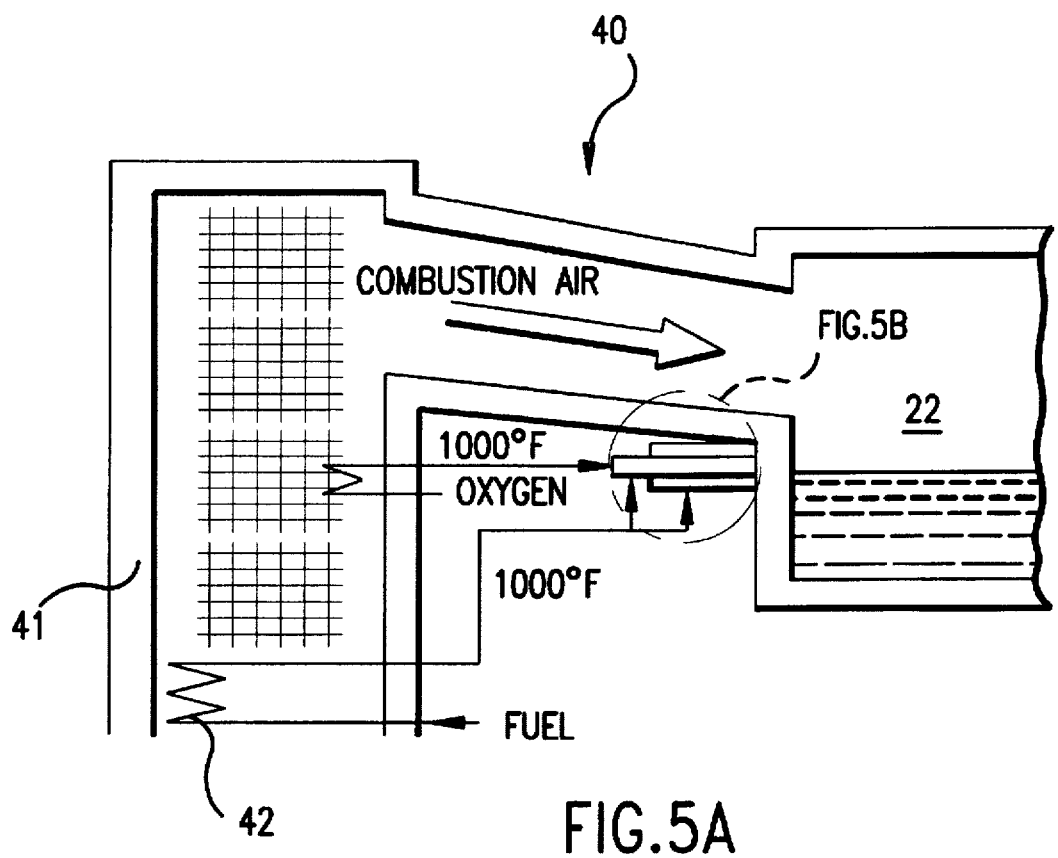
FIG. 5 is a schematic diagram of a portion of a regenerative industrial furnace having the system shown in FIGS. 1 or 2 and further showing preheating of the fuel by the furnace heat recovery system.
Figure 5B:
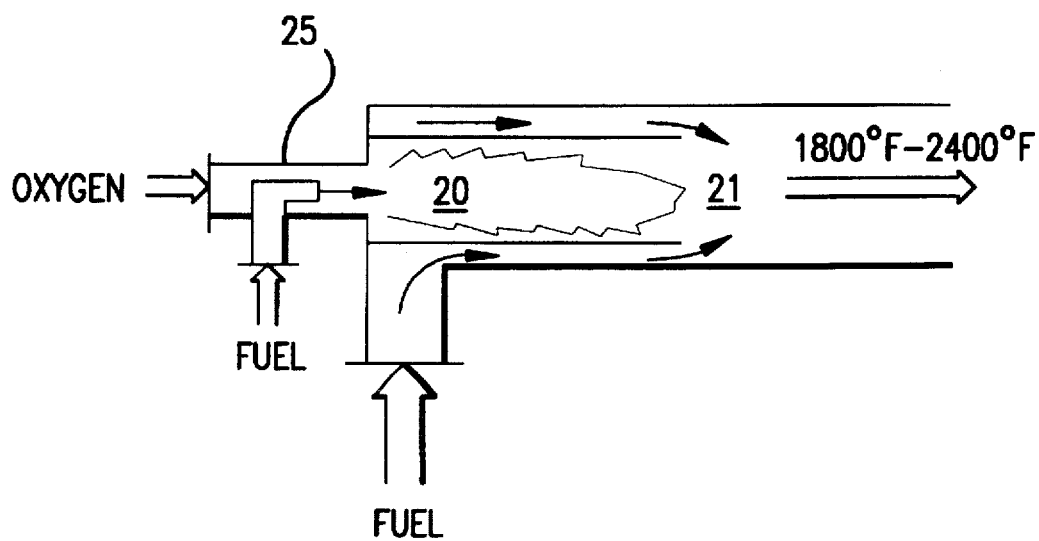

FIG. 5 is a schematic diagram of a regenerative glass melter employing a high-heat transfer, low $NO_x$ oxygen-fuel combustion system as shown in FIG. 1 as an example of a furnace with heat recovery utilizing combustion air as the main oxidant. In accordance with this embodiment of the invention, fuel used for firing in regenerative glass melter 40 is preheated up to 1000° F. in heat exchanger 42 utilizing waste heat from regenerators 41 and then injected into the burner as two separate streams. One stream is used for firing with oxidant within precombustor 25 to preheat the other stream to temperatures up to about 2000° F. The resulting fuel is then mixed with combustion air within main combustion zone 22 and burned. It will be apparent to those skilled in the art that this invention is employable in other types of furnaces with heat recovery, such as recuperative furnaces.

While in the foregoing specification this invention has been described in relation to certain preferred embodiments thereof, and many details have been set forth for purpose of illustration, it will be apparent to those skilled in the art that the invention is susceptible to additional embodiments and that certain of the details described herein can be varied considerably without departing from the basic principles of the invention.

We claim:

1. A process for combustion of a mixture of fuel and oxidant comprising:

preheating at least a portion of said fuel by preburning a first portion of said portion of said fuel with a preburn oxidant having an amount of oxygen greater than the amount of oxygen in air, forming precombustion products;

mixing said preheated fuel with any remaining portion of said fuel, at least a portion of an oxidant required for complete combustion of said fuel, and said precombustion products and igniting said mixture, forming a flame; and then forming soot within said flame to produce a luminous flame.

2. A process in accordance with claim 1, wherein said fuel is natural gas.

3. A process in accordance with claim 1, wherein said oxidant is selected from the group consisting of oxygen and oxygen-enriched air.

4. A process in accordance with claim 1, wherein said fuel is preheated in a furnace heat recovery system.

5. A process in accordance with claim 1, wherein said fuel is preheated in stages, a first stage comprising preheating in a furnace heat recovery system and a second stage comprising preheating by said preburning of said at least a portion of sad fuel from said first stage with said preburn oxidant having an amount of oxygen greater than the amount of oxygen in air, forming said precombustion products, and mixing said precombustion products with said remaining portion of said fuel from said first stage.

6. A process in accordance with claim 6, wherein said fuel is preheated up to 1000° F. in said first stage.

7. A process in accordance with claim 1, wherein formation of said soot within said flame is achieved by controlled mixing.

8. A process in accordance with claim 1, wherein said fuel is preheated to a temperature between about 700° F. and about 2400° F.

9. A process in accordance with claim 1, wherein said precombustion is carded out in a cyclonic chamber.

10. A process in accordance with claim 1, wherein at least a portion of said oxidant is preheated.

11. A process in accordance with claim 10, wherein said oxidant is preheated up to about 1000° F.

12. An apparatus for combustion of a mixture of fuel and oxidant comprising:

preheat means for preheating at least a portion of said fuel, said preheat means comprising one of a furnace heat recovery system and a precombustor, said precombustor being a premixed cyclonic oxygen/natural gas chamber;

mixing means for mixing preheated fuel with at least a portion of an oxidant required for complete combustion of said fuel; and combustion means for combustion of said preheated fuel and said oxidant and any remaining portion of said fuel, said combustion means comprising means for forming soot within a flame generated by said combustion means.

* * * * *